J. G. PERRY.
Meat Cutter.
No. 1,278. Reissued Feb. 25, 1862.
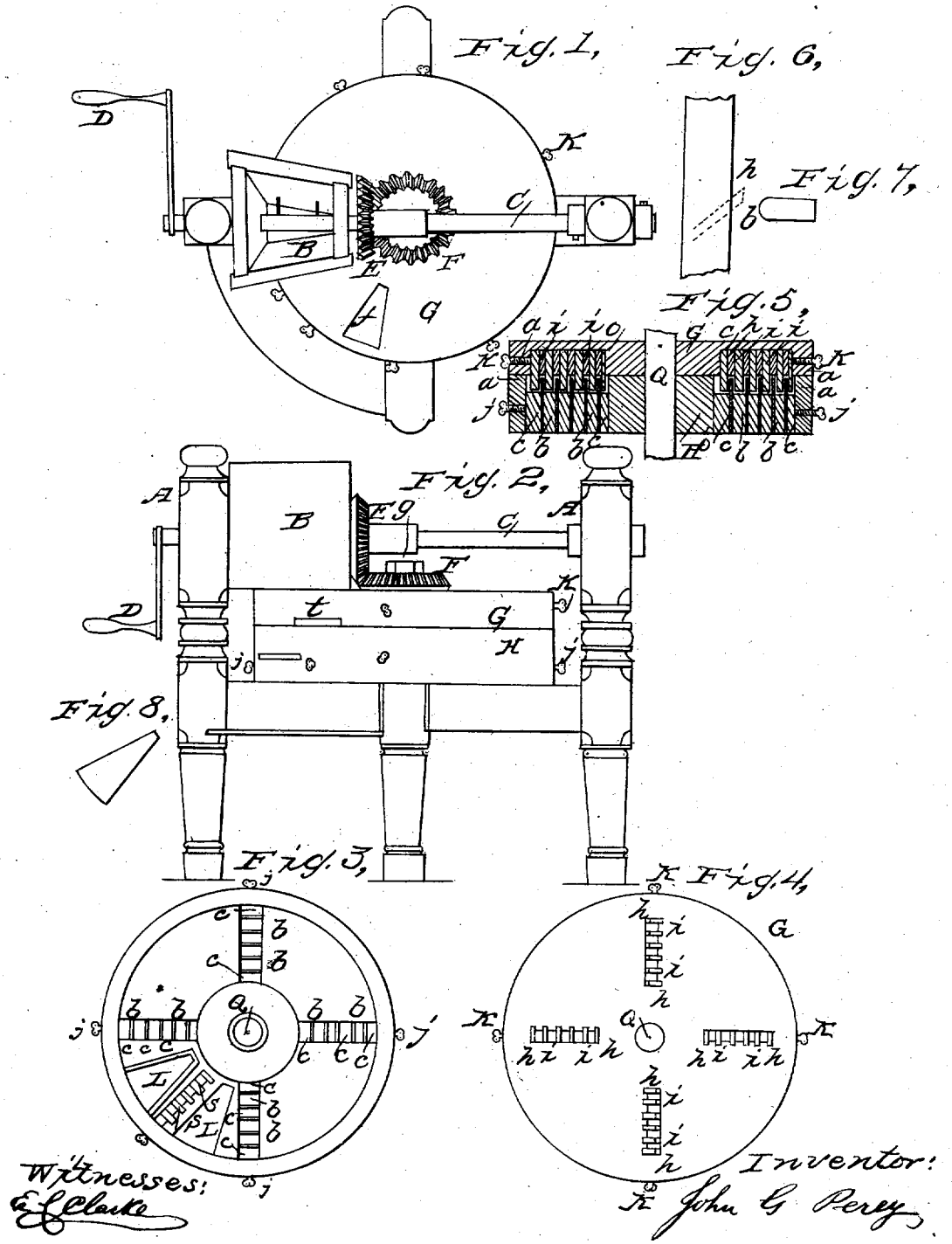
N. PETERS, Photo-Lithographer, Washington, D. C.

UNITED STATES PATENT OFFICE.

JOHN G. PERRY, OF SOUTH KINGSTOWN, RHODE ISLAND.

IMPROVEMENT IN MEAT-CUTTING APPARATUS.

Specification forming part of Letters Patent No. 7,123, dated February 26, 1850; Reissue No. 1,278, dated February 25, 1862.

*To all whom it may concern:*

Be it known that I, JOHN G. PERRY, of South Kingstown, in the county of Washington, in the State of Rhode Island, have invented new and useful Improvements on a Machine for Mincing Meat; and I do hereby declare that the following is a full, clear, and exact description thereof, reference being had to the accompanying drawings, forming part of this specification, in which—

Figure 1 is a top or plan view. Fig. 2 is a side elevation. Fig. 3 is a top view of the nether or knife block. Fig. 4 is a top view of the rotating upper block with its studs. Fig. 5 is a vertical section of the top and nether block. Fig. 6 is a section showing the way in which the studs are placed in the block. Fig. 7 is a view of the knife. Fig. 8 is a view of slide for the discharge-opening.

The same letters refer to like parts in all the figures.

The nature of my invention consists in providing a series of radiating curved knives in a stationary block and a series of studs, also radiating, in a rotating block, and combining the two said blocks together to make the studs act as rakes to revolve and press the meat, &c., against the knives, to mince the meat, &c., in the manner more clearly explained hereinafter.

To enable others skilled in the art to make and use my invention, I will proceed to describe the construction and operation.

The blocks, &c., are mounted on cross-beams, which are supported by legs, two of which, A A, answer the purpose of posts. B is the hopper to feed the meat, &c., into the knives. C is a shaft extending through the hopper and supported in bearings in the two posts. D is the handle to drive the said shaft. E is a bevel-pinion on the shaft. It meshes into a bevel-wheel, F. This bevel-wheel is secured around a vertical stationary shaft, Q, the which shaft extends down through the center of the blocks, and has a nut secured on it below, and one on the top to retain it firm in its place. The bevel-wheel is fastened by screws or otherwise to the top of the top block, G, to give motion to it when the pinion E is revolved. H is the under stationary block. It has a series of curved knives, *b b b*, set in it to project a short distance above its surface, each with its crescent uppermost. The block is formed with an upraised rim, *a*. Recesses *o* are cut out to receive the knives, and each knife is set in with a small block, *c*, placed between it and its fellow, the upper surface of each small block being level with the surface of the large block. *j j* are set-screws, which extend through the block H, against the outer small block, *c*, to hold the knives securely, and for the purpose of putting them in and taking them out easily to be sharpened.

G is the upper rotating block. It is of the same form as the under one, and the rims of both fit closely together, so that when the top one is placed on the lower one the space between the blocks inside forms the meat-mincing chamber. This block has a series of studs, *h h h*, set into it to project in the manner represented in Fig. 6. These studs are retained in their places in the same way as the knives *b b* in the lower block, *i i i* being the small blocks and *k k* the set-screws.

The top block, G, and the lower block, H, are placed in relation to one another with the studs *h h* passing between the knives, as represented in Fig. 5. *f* is an opening in the upper block, G, which communicates with the mincing-chamber. The bottom of the hopper is made to set close to the top of the block, but is secured firmly to the post.

The meat, &c., is fed into the hopper, and when the opening *f* comes below it the meat is received into the chamber to be acted on by the drags or studs and the knives. The knives and studs can be set at different distances apart with blocks of different sizes between them to mince the meat, &c., to different degrees of fineness. The minced meat, &c., drops down through the openings L into a receiver below. There are a set of studs, *s s s*, on the bar that divides the two openings L. The use of these studs is to keep the meat from passing around continually, and to direct it into the receiver when minced. These studs *s s* answer the same purpose whether the block be turned in one direction or the other, because of the two openings L, either of which may be closed at pleasure, (according to which way the block is turned,) by means of the slide, Fig. 8, and when the machine is used in a vertical position instead of a horizontal one these two apertures, L L, are used—one as a feeding-aperture to put the meat in, and the other for it to be discharged at by the action of the studs *s s s*—and the slide, Fig. 8, is placed in the slot marked *t* to close the opening *f* in the top block.

Having thus described my improvement, what I claim as my invention, and desire to secure by Letters Patent, is—

1. The use and employment of the studs *s s s*, Fig. 3, with one or both of the discharge-openings L L, substantially as described, and for the purpose herein set forth.

2. Combining the knives and space-blocks with the case of a meat-cutter, in the manner substantially as herein described, and for the purposes set forth.

JOHN G. PERRY.

Witnesses:
J. G. CLARKE, Jr.,
E. C. CLARKE.